US008743109B2

(12) United States Patent
Blank et al.

(10) Patent No.: US 8,743,109 B2
(45) Date of Patent: Jun. 3, 2014

(54) SYSTEM AND METHODS FOR MULTI-DIMENSIONAL RENDERING AND DISPLAY OF FULL VOLUMETRIC DATA SETS

(75) Inventors: James Blank, Kent, OH (US); Robert Clements, Stow, OH (US)

(73) Assignee: Kent State University, Kent, OH (US)

( * ) Notice: Subject to any disclaimer, the term of this patent is extended or adjusted under 35 U.S.C. 154(b) by 979 days.

(21) Appl. No.: 11/847,919

(22) Filed: Aug. 30, 2007

(65) Prior Publication Data
US 2008/0055305 A1 Mar. 6, 2008

Related U.S. Application Data

(60) Provisional application No. 60/824,179, filed on Aug. 31, 2006.

(51) Int. Cl.
*G06T 15/00* (2011.01)

(52) U.S. Cl.
USPC .......................................... 345/419; 345/424

(58) Field of Classification Search
CPC ............. A61B 19/5244; A61B 6/5247; A61B 2019/5289; A61B 6/5235; A61B 8/5238; A61B 8/5261; A61B 5/7425; G06T 7/0028; G06T 7/0024; G06T 7/0026; G06T 7/0034; G06T 7/0038; G06T 7/0036
See application file for complete search history.

(56) References Cited

U.S. PATENT DOCUMENTS

| 4,631,580 | A | 12/1986 | Taube et al. |
| 4,669,812 | A | 6/1987 | Hoebing |
| 5,493,595 | A | 2/1996 | Schoolman |
| 6,002,720 | A * | 12/1999 | Yurt et al. ...................... 375/240 |
| 6,233,389 | B1 * | 5/2001 | Barton et al. .................. 386/232 |
| 6,424,344 | B1 | 7/2002 | Lee |
| 6,608,628 | B1 | 8/2003 | Ross et al. |

(Continued)

FOREIGN PATENT DOCUMENTS

| EP | 0 629 963 | 12/1994 |
| GB | 1021878 | 3/1966 |

(Continued)

OTHER PUBLICATIONS

A. Ghosh, P. Prabhu, A. E. Kaufman, K. Mueller, "Hardware Assisted Multichannel Volume Rendering", Jul. 11, 2003, Computer Graphics International 2003 Proceedings.*

(Continued)

*Primary Examiner* — Ulka Chauhan
*Assistant Examiner* — Robert Bader
(74) *Attorney, Agent, or Firm* — Hahn Loeser + Parks LLP; Scott M. Oldham, Esq.

(57) ABSTRACT

A stand-alone platform and a method for the multi-dimensional rendering, display, manipulation, and analysis of full high resolution volumetric data sets. The systems and methods provide the ability to volumetrically render images with extremely high resolution in applications such as medical imaging procedures, digital microscopy such as in use of a confocal microscope, and other areas where extremely large data sets are produced from the imaging process. Certain embodiments of the system and methods produce left and right eye images of the rendered data, for viewing in parallax via a synchronized headset, and the ability to manipulate the data and display of image data easily and in real time.

19 Claims, 10 Drawing Sheets

(56) References Cited

U.S. PATENT DOCUMENTS

| | | | |
|---|---|---|---|
| 7,257,158 B1* | 8/2007 | Figueredo et al. ....... | 375/240.01 |
| 2004/0049530 A1 | 3/2004 | Lok et al. | |
| 2004/0240752 A1 | 12/2004 | Dobbs et al. | |
| 2005/0151730 A1 | 7/2005 | Lobregt | |
| 2005/0203380 A1 | 9/2005 | Sauer et al. | |
| 2005/0207529 A1 | 9/2005 | Boese et al. | |
| 2005/0228250 A1 | 10/2005 | Bitter et al. | |
| 2005/0244042 A1 | 11/2005 | Sirohey et al. | |
| 2005/0264578 A1 | 12/2005 | Engel et al. | |
| 2006/0034511 A1 | 2/2006 | Verstraelen et al. | |
| 2006/0173338 A1 | 8/2006 | Ma et al. | |

FOREIGN PATENT DOCUMENTS

| | | |
|---|---|---|
| JP | 2001149319 | 6/2001 |
| WO | WO0229700 | 4/2002 |
| WO | WO2005055008 | 6/2005 |
| WO | WO2005091226 | 9/2005 |

OTHER PUBLICATIONS

D.J. Hancock and R.J. Hubbold, "Efficient Image Synthesis on Distributed Architectures", 1997, Academic Press, The Internet in 3D, Information, Images and Interaction, pp. 347-364.*

R. J. Hubbold, D. J. Hancock, and C. J. Moore, "Stereoscopic Volume Rendering", 1998, Proceedings of Visualization in Scientific Computing, pp. 105-115.*

S. Pastoor, M. Wopking, "3-D displays: A review of current technologies", Apr. 1, 1997, Elsevier Science B.V., Displays 17, pp. 100-110.*

P. Bhaniramka, Y. Demange, "OpenGL Volumizer: A Toolkit for High Quality Volume Rendering of Large Data sets", Oct. 29, 2002, IEEE, VVS '02 Proceedings of the 2002 IEEE symposium on Volume visualization and graphics.*

S. M. Drucker, A. Glatzer, S. De Mar, C. Wong, "SmarkSkip: consumer level browsing and skipping of digital video content", Apr. 25, 2002, ACM, Proceedings of the SIGCHI conference on Human factors in computing systems: Changing our world, changing ourselves.*

Xishi Huang, Nicholas A. Hill, Jing Ren, Gerard Guiraudon, Derek Boughner, Terry M. Peters, "Dynamic 3D Ultrasound and MR Image Registration of the Beating Heart", 2005, Springer-Verlag, Medical Image Computing and Computer-Assisted Intervention—MICCAI 2005, Lecture Notes in Computer Science vol. 3750, 2005, pp. 171-178.*

Andrei State, Jordan McAllister, Ulrich Neumann, Hong Chen, Tim J. Cullip, David T. Chen, Henry Fuchs, "Interactive Volume Visualization on a Heterogeneous Message-Passing Multicomputer", 1995, ACM, I3D '95 Proceedings of the 1995 Symposium on Interactive 3D Graphics, pp. 69-74, 208.*

TP Mason, EL Applebaum, M Rasmussen, A Millman, R Evenhouse, W Panko, "The Virtual Temporal Bone", 1998, Studies in Health Technology and Informatics, vol. 50, pp. 346-352.*

R. Wolfe, W. Fitzgerald, F. Gracer, "Interactive Graphics for Volume Modeling", 1981, IEEE, DAC '81 Proceedings of the 18$^{th}$ Design Automation Conference, pp. 463-470.*

Search Report for corresponding PCT International Application No. PCT/US2007/077322, dated Aug. 31, 2007.

D.G. Simonetti, "Interactive Visualization of Biomedical Data," (2003).

J.-W. Hwang et al., "A PC-based high-quality and interactive virtual endoscopy navigating system using 3D texture based volume rendering," Computer Methods and Programs in Biomedicine, 71, 77-84 (2003).

H.J. Noordmans et al., "Fast volume render techniques for interactive analysis," The Visual Computer, 13, 345-358 (1997).

R.J. Frank et al., "Brainvox: An Interactive, Multimodal Visualization and Analysis System for Neuroanatomical Imaging," Neuroimage, 5, 13-30 (1997).

A. State et al., "Interactive Volume Visualization on a Heterogeneous Message-Passing Multicomputer."

T. Daggett, I.R. Greenshields, "A cluster computer system for the analysis and classification of massively large biomedical image data," Computers in Biology and Medicine, 28, 47-60 (1998).

E.V. Zudilova, P.M.A. Sloot, "Bringing combined interaction to a problem solving environment for vascular reconstruction," Future Generation Computer Systems, 21, 1167-1176 (2005).

A.P. King et al., "Stereo Augmented Reality in the Surgical Microscope," Presence, 9, 360-368 (2000).

T.P. Mason et al., "The Virtual Temporal Bone / Abstract," Virtual Reality in Medicine Lab.

C. Krapichler et al., "Physicians in virtual environments—multimodal human-computer interaction," Interacting with Computers, 11, 427-452 (1999).

K. Mueller et al., "A Medical Workstation for the Display and Analysis of Multi-Frame Digital Cineradiographic Data," Comput. Biol. Med., 26, 385-400 (1996).

B. Sheehan et al, "AVS Software for Visualization in Molecular Microscopy," Journal of Structural Biology, 116, 99-106 (1996).

R. Wolfe et al., "Interactive Graphics for Volume Modeling," 18th Design Automation Conference.

* cited by examiner

Fig. 7
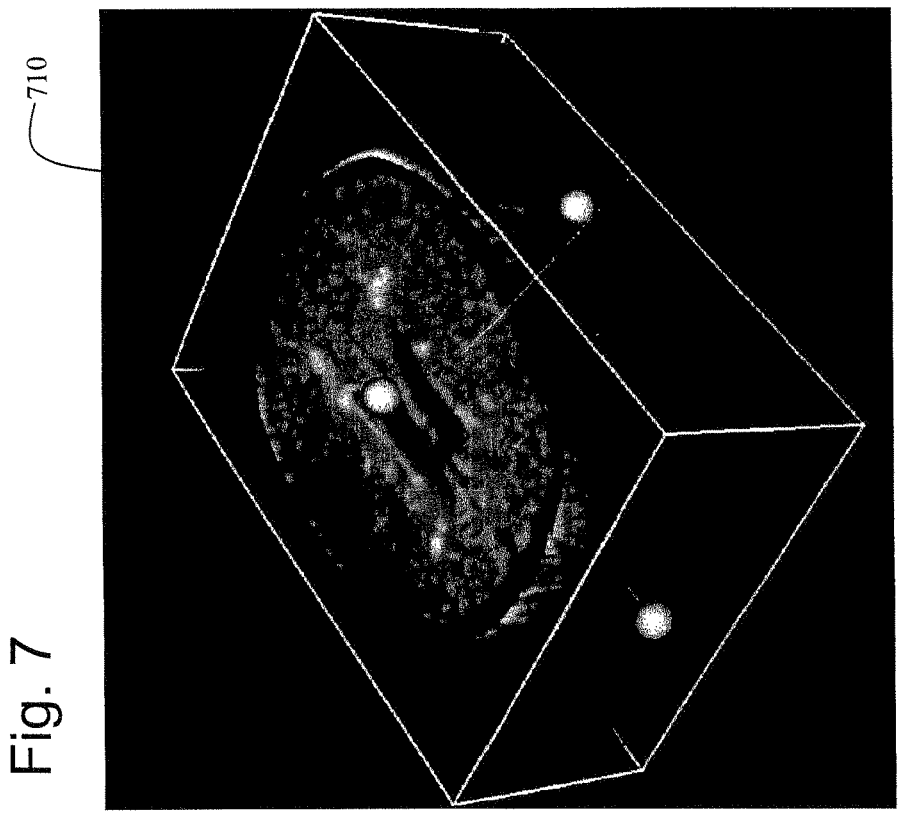
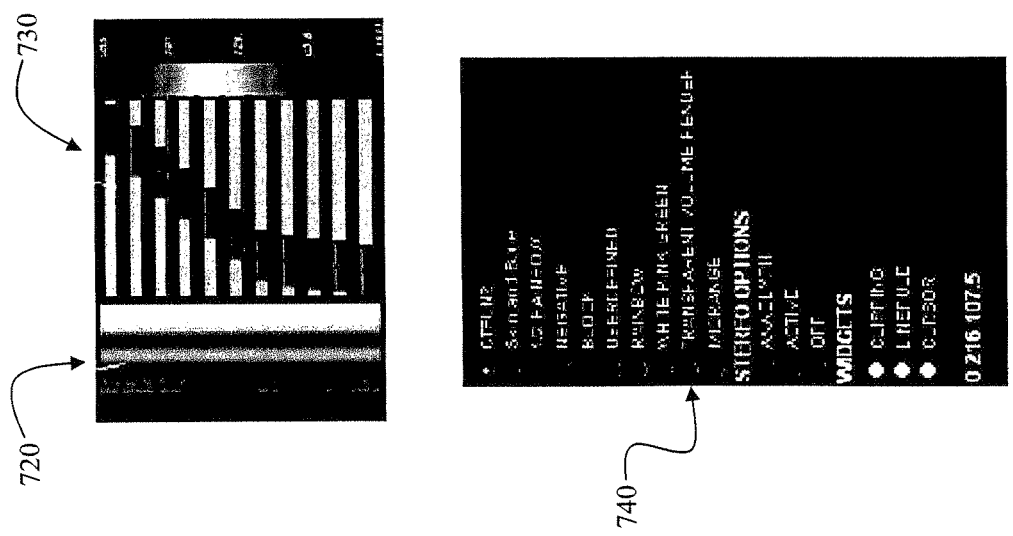

SYSTEM AND METHODS FOR MULTI-DIMENSIONAL RENDERING AND DISPLAY OF FULL VOLUMETRIC DATA SETS

CROSS-REFERENCE TO RELATED APPLICATIONS/INCORPORATION BY REFERENCE

This U.S. patent application claims priority to and the benefit of Provisional U.S. Patent Application Ser. No. 60/824,179 filed on Aug. 31, 2006, which is incorporated by reference herein in its entirety.

GOVERNMENT SUPPORT

The U.S. Government may have a paid-up license in this invention and the right in limited circumstances to require the patent owner to license others on reasonable terms as provided for by the terms of grant nos. 441147 and 441129 from the Fund for the Improvement of Post-Secondary Education (FIPSE). The state of Ohio may have a paid up license in this invention and the right in limited circumstances to require the patent owner to license others on reasonable terms as provided for by the terms of Technology Action Fund (TAF) grant no. 444505 from the Ohio Board of Regents of the State of Ohio.

TECHNICAL FIELD

Certain embodiments of the present invention relate to systems and methods for the real time display and manipulation of extremely large data sets using real time volume rendering and display of volumetric images (e.g., stereoscopic volumetric images) using all the data from extremely large data sets. The systems and methods provide the ability to volumetrically render images with extremely high resolution in applications such as medical imaging procedures, digital microscopy such as in use of a confocal microscope, and other areas where extremely large data sets are produced from the imaging process. Certain embodiments of the system and methods produce left and right eye images of the rendered data, for viewing in parallax via a synchronized headset, and the ability to manipulate the data and display of image data easily and in real time.

BACKGROUND

There have been attempts to provide three-dimensional (3D) imaging of data to facilitate analysis of the data for various applications, including for use in medical imaging for example. Medical personnel have an important need to see and visualize image data of the structure and condition of a patient's internal anatomical structures. Such image data may be generated by non-invasive techniques, such as by imaging modalities which produce three dimensional (3D) image information. These techniques include, for example, computed tomography (CT), magnetic resonance imaging (MRI), positron emission tomography (PET), tomographic gamma scintillation imaging, ultrasound imaging, nuclear medical imaging/spectroscopy and other techniques.

Using such medical imaging techniques, extremely large data sets are produced in many cases. The mere volume of data can make it prohibitive to attempt to use the data in generating display of the image data. It would be desirable to use the entire image data set to generate a 3D display of image data in real time, but prior attempts at volumetrically displaying the image data have not produced a system or methods which allow for such rendering while making it possible to manipulate the data for evaluation and analysis. The data sets in many cases are simply too large to handle in known display systems. Thus, such attempts have been directed at reducing the size of the data set and interpolating the data to produce a volumetric display without using all the available data. Such attempts produce results of limited value as important structures, details or information may not be seen in the displayed data. Further, it would be desirable to provide a system and methods which allow large data sets from any type of imaging device, regardless of manufacturer and/or imaging techniques, where volumetric data is produced. This includes, but is not limited to MRI data, ultrasound data, PET scan data, CT scan data, Echo data or any other imaging devices or technologies.

It would therefore be desirable to provide a medical image data display system and methods which produces a 3D volumetric representation of internal anatomical structures produced from a medical imaging technique, using all available data and providing the physician or other observer with the ability to manipulate the displayed image data interactively in real time such that the object may be viewed from various directions and in various modes in real time. It would also be desirable to generate a real time display of volumetric image data for viewing in a 3D stereoscopic format.

Other environments and applications also generate extremely large volumetric data sets, such as in the acquisition of image data using digital microscopy such as from a confocal microscope, for example, or in the acquisition of seismic data representative of a volume of earth or other medium, weather system data or in other areas. Prior systems and methods may not be suitable for real-time volume rendering to visualize a large-scale volume data set, in terms of handling the data and being cost-effective. Although very expensive and sophisticated dedicated systems may provide certain features, the cost and end user availability of such systems is prohibitive for general use. It would be desirable to provide a system which both gives high resolution of the data with stereoscopic viewing and real time manipulation of the image data for effectively visualizing information contained therein in a cost effective solution.

Prior systems are further generally unable to handle time varying data sets, which generally cannot be rendered in a form where the data can be viewed based upon its time relationship with other related data. For example, in medical imaging it would be desirable to provide the ability to image time varying data to perceive differences between the data over time. Generally, time varying data is not able to be rendered for viewing in a coherent manner, and cannot be rendered in real time to allow a user to interact with the data in the desired way.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY

Certain embodiments of the present invention are directed to providing systems and methods which overcome the limitations of the prior attempts of displaying three dimensional images, and allows for the real-time volume and surface rendering of large-scale volume data sets to visualize three dimensional structures within the data. The system and methods provide rendering of volumetric display information via a stand-alone platform (e.g., a server platform) which may be connected or networked to at least one local or remote viewing system, with processing being performed at the server side prior to being sent on to the viewing system(s). The viewing system may be a two dimensional video display device, wherein volumetric data is displayed in, for example, two angularly displaced images which are consecutively viewed via the display device for a true stereoscopic display of the three dimensional image data. For example, the 3D image data is viewed by two video display devices associated with a stereoscopic viewing system, such as in the form of stereoscopic glasses to provide projection of the stereoscopic image components sequentially to the right and left eyes respectively of the viewing in motion parallax. Alternatively, the 3D volumetric data may be displayed using passive stereoscopic image technology or monoscopic image technology. A viewer may interact with the system using a suitable user interface, such as via voice commands, a computer mouse, a keyboard, a touch screen, a tracked virtual reality device such as a pinch glove or v-wand for example or any other human interface device (HID).

The system, according to an embodiment of the present invention, comprises a multi-dimensional display system for volumetric imaging of data sets having a size of one Gigabyte (GB) or more of volumetric data, for example. The system is generally portable, being configured with a stand-alone platform (e.g., a stand-alone image rendering server) with a predetermined amount of internal memory. A video driver allows access to functions on the video hardware for handling volumetric data is provided to render server side generated monoscopic and passive or active stereoscopic images in conjunction with a rendering software/hardware backend associated with the server side. If the images are to be viewed remotely, the video driver may have hooks which poll a local video buffer to update changes in the represented image data. Otherwise, the local video buffer is used to display the images locally. For viewing remotely, the generated images are sent to a remote viewer, which may be a stereoscopic thin client. In an embodiment, the server side is coupled to one or more remote viewers via a network, including a global information network such as the Internet, or other network. From the server side, a remote framebuffer (RFB) protocol passes video buffer information and changes to the remote viewer, where it is buffered via the viewer client system. From the buffered RFB passive stereoscopic image data, the remote viewer may provide a passive stereo display for use on suitable passive stereo display technology via a 3D viewer. Alternatively, the stereoscopic thin client may provide an active stereo display, where the passive stereo image is split into left and right sources via the processing system of the viewer thin client. The left and right sources are mapped into the left and right stereo buffers, and supply display information to an active stereoscopic viewing system. The viewer thin client also may include a HID to allow a user to interact with the stereo display to manipulate the display information and parameters. Any desired modifications in the displayed image data or parameters are sent from the viewer thin client to the server side, with events received and sent to the rendering backend for manipulation of the display parameters, and modification of the display information sent to the viewer thin client from the server side in real time.

In accordance with an embodiment, the system server computer of the stereoscopic image display system includes the hardware and software to render multi-dimensional image displays using all information in extremely large data sets, such as in the medical imaging, digital microscopy or other environments where such data is generated. The rendered volumetric image data is supplied to a viewer thin client that therefore does not require processing capabilities to provide such rendering. The viewer thin client provides the capabilities of stereoscopic viewing and manipulation of the display parameters. The system may be based on a PC platform, such that it is extremely cost efficient while providing the desired real time image display characteristics for data sets having 1 GB of data or more, for example. The system uses the actual volumetric data without interpolation to greatly increase resolution in the displayed image data. The system also allows volumetric 4D image display with volumetric image data displayed over a predetermined time period and/or at predetermined time intervals. For example, the volume may be updated so as to provide the ability to page through each time point in the 4D data set, allowing interaction and manipulation with the stereoscopic 4D data (i.e., a beating heart, multi-timepoint MRI, etc.).

It is contemplated, according to certain embodiments, that video processing devices may be developed in the future which would eliminate the need for various supporting systems to handle the size of the data sets for which the present system is useful. Embodiments of the present invention contemplate such improvements and suitable modifications would occur to those skilled in the art based on such improvements to simplify or reduce the costs associated with the system.

An embodiment of the present invention comprises a stand-alone platform providing real time high resolution image processing. The stand-alone platform includes a first processing unit adapted to automatically read a plurality of volumetric data sets corresponding to a plurality of multi-modal or multi-channel volumetric data formats derived from at least one volumetric data source and extract fully acquired volumetric data from the data sets. The stand-alone platform further includes a system bus operationally connected to the at least one processing unit, and at least one graphics processing unit and memory operationally connected to the system bus and adapted to receive the fully acquired volumetric data from the first processing unit via the system bus. The stand-alone platform also includes at least one graphics processing unit operationally connected to the graphics processing unit memory and adapted to render multi-dimensional image data from the fully acquired volumetric data in real time. The stand-alone platform further includes a frame compositing and buffering device operationally connected to the at least one graphics processing unit and adapted to buffer frames of the rendered multi-dimensional image data and output the buffered frames for display in real time.

Another embodiment of the present invention comprises a system providing multi-dimensional rendering, display, and manipulation of full high resolution volumetric data sets. The system includes a stand-alone platform adapted to render multi-dimensional image data in real time from a plurality of fully acquired volumetric data sets corresponding to a plurality of multi-modal or multi-channel volumetric data formats derived from at least one volumetric data source. The system further includes at least one display subsystem operationally connected to the stand-alone platform and adapted to display the rendered multi-dimensional image data in real time. The system also includes at least one human interface device (HID) operationally connected to the stand-alone platform and adapted to provide interactive real time manipulation and modification of the rendered multi-dimensional image data.

A further embodiment of the present invention comprises a system providing multi-dimensional rendering, display, and manipulation of full high resolution volumetric data sets. The system includes a stand-alone platform adapted to render multi-dimensional image data in real time from a plurality of fully acquired volumetric data sets corresponding to a plurality of multi-modal or multi-channel volumetric data formats derived from at least one volumetric data source. The system further includes at least one remote thin client viewer operationally connected to the stand-alone platform and adapted to receive the rendered multi-dimensional image data from the stand-alone platform in real time using a remote frame buffer (RFB) protocol, and adapted to display the rendered multi-dimensional image data stereoscopically in real time. The system also includes at least one human interface device (HID) operationally connected to the remote thin client viewer and adapted to initiate interactive real time manipulation and modification of the rendered multi-dimensional image data upon activation of the HID by a user. The manipulation and modification is accomplished when the remote thin client viewer sends an event command to the stand-alone platform in real time in response to the HID activation. The rendered multi-dimensional image data is updated by the stand-alone platform in real time in response to the event command and the stand-alone platform sends the updated rendered multi-dimensional image data to the remote thin client viewer in real time using the RFB protocol. The updated rendered multi-dimensional image data is displayed by the remote thin client viewer in real time.

Another embodiment of the present invention comprises a method for the multi-dimensional rendering, display, manipulation, and analysis of full high resolution volumetric data sets. The method includes automatically loading a plurality of fully acquired volumetric data sets corresponding to a plurality of multi-modal or multi-channel volumetric data formats derived from at least one volumetric data source into a stand-alone platform. The method further includes processing the plurality of fully acquired volumetric data sets within the stand-alone platform to extract fully acquired volumetric data from the data sets and to generate at least one rendered volume image in real time from the extracted data. The method also includes displaying at least one rendered volume image on a display subsystem in real time and modifying at least one display parameter of the displayed rendered volume image using at least one human interface device (HID) operationally connected to the stand-alone platform. The method further includes updating the at least one rendered volume image within the stand-alone platform in real time in response to the at least one modified display parameter and displaying the updated at least one rendered volume image on the display subsystem in real time.

A further embodiment of the present invention comprises a stand-alone platform providing real time high resolution image processing. The stand-alone platform includes means for automatically reading a plurality of volumetric data sets corresponding to a plurality of multi-modal or multi-channel volumetric data formats derived from at least one volumetric data source and extracting fully acquired volumetric data from the data sets. The stand-alone platform further includes means for rendering multi-dimensional image data from the fully acquired volumetric data in real time, and means for buffering frames of the rendered multi-dimensional image data and outputting the buffered frames for display in real time.

Another embodiment of the present invention comprises a system providing multi-dimensional rendering, display, and manipulation of full high resolution volumetric data sets. The system includes means for rendering multi-dimensional image data in real time from a plurality of fully acquired volumetric data sets corresponding to a plurality of multi-modal or multi-channel volumetric data formats derived from at least one volumetric data source. The system further includes means for displaying the rendered multi-dimensional image data in real time and means for providing interactive real time manipulation and modification of the rendered multi-dimensional image data.

A further embodiment of the present invention comprises a system providing multi-dimensional rendering, display, and manipulation of full high resolution volumetric data sets. The system includes means for rendering multi-dimensional image data in real time from a plurality of fully acquired volumetric data sets corresponding to a plurality of multi-modal or multi-channel volumetric data formats derived from at least one volumetric data source. The system further includes means for remotely receiving and displaying the rendered multi-dimensional image data in real time. The system also includes means for remotely initiating interactive real time manipulation and modification of the rendered multi-dimensional image data. The manipulation and modification is accomplished when an event command is received in real time at the means for rendering in response to the initiating. The rendered multi-dimensional image data is updated by the means for rendering in real time in response to the event command. The means for rendering sends the updated rendered multi-dimensional image data to the means for remotely receiving and displaying in real time, and the updated rendered multi-dimensional image data is displayed in real time.

Another embodiment of the present invention comprises a stand-alone platform providing real time high resolution image processing. The stand-alone platform includes means for automatically reading a plurality of volumetric data sets corresponding to a plurality of multi-modal or multi-channel volumetric data formats derived from at least one volumetric data source and extracting fully acquired volumetric data from the data sets. The stand-alone platform also includes means for rendering multi-dimensional image data from the fully acquired volumetric data in real time. The stand-alone platform further includes means for automatically re-configuring the means for rendering based on at least one characteristic of the volumetric data sets. The stand-alone platform further includes means for buffering frames of the rendered multi-dimensional image data and outputting the buffered frames for display in real time.

These and other advantages and novel features of the present invention, as well as details of illustrated embodiments thereof, will be more fully understood from the following description and drawings.

BRIEF DESCRIPTION OF THE DRAWINGS

FIG. 7 illustrates an exemplary embodiment of a displayed rendered volume image generated by the volume rendering system of FIG. 1;

DETAILED DESCRIPTION

Figure 1:
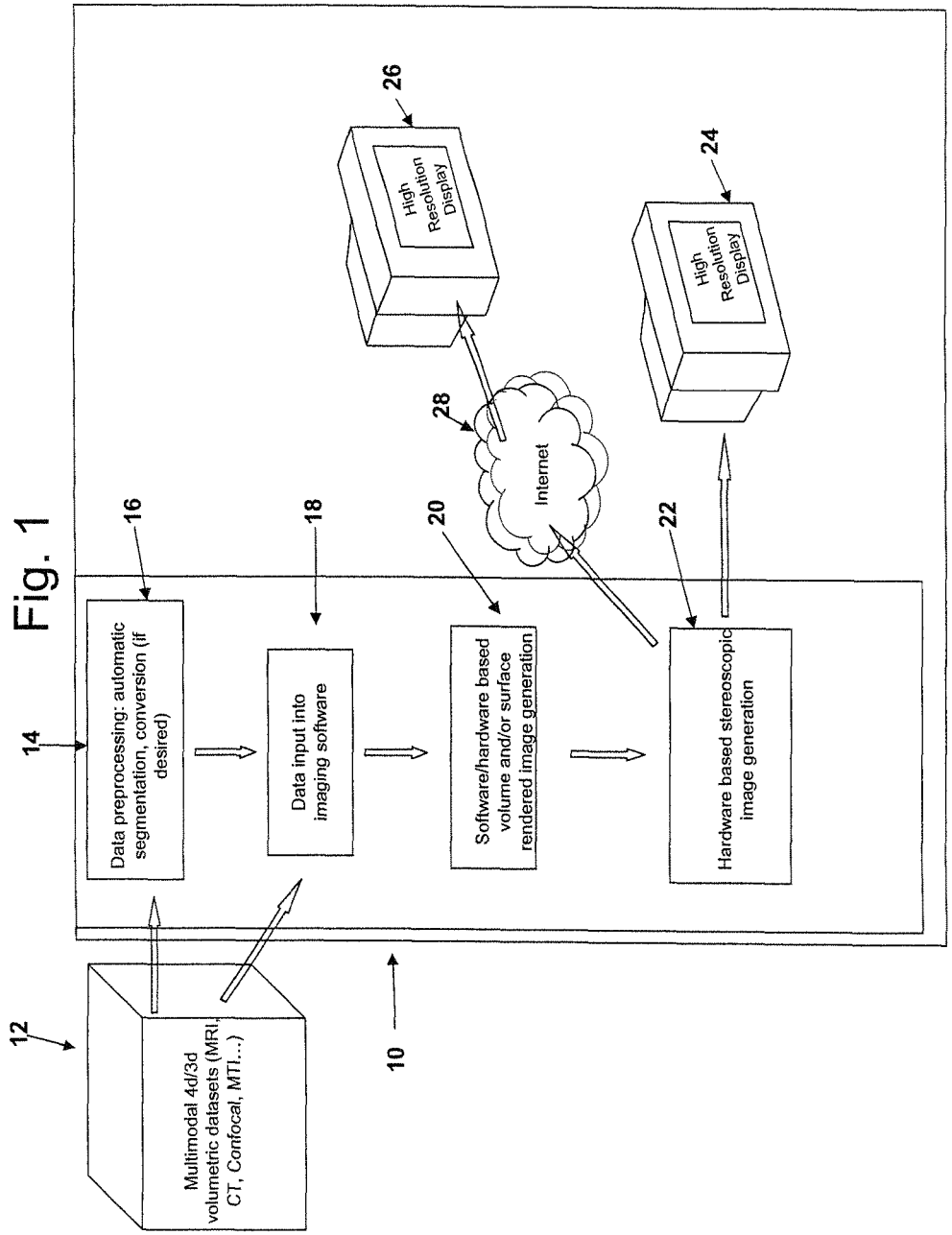
FIG. 1 illustrates an exemplary functional block diagram of a first embodiment of a real time volume rendering system.

FIG. 1 illustrates an exemplary functional block diagram of a first embodiment of a real time volume rendering system 10 according to an example of the invention, for use in generating and displaying volumetric image data. A dataset 12 comprises a multimodal 3D/4D volumetric dataset, such as may be produced in medical imaging systems, digital microscopy imaging, seismic exploration or other systems where an extremely large amount of volumetric data is generated. Although the system 10 is capable of volumetric image display using smaller datasets, it is particularly useful for very large datasets of one GB or more. More particularly, the system 10 is usable to image in real time, datasets of three GB or more. In accordance with an embodiment, the imaging hardware and software will automatically adapt to handle data sets of significantly different byte sizes. With datasets of large size, many prior systems have not been able to effectively process and render image data from the entire dataset, instead resorting to interpolation techniques or surface rendering techniques to form a pseudo-volumetric image display, and not using all of the data acquired and available for imaging.

Although many such datasets may require no preprocessing for effectively rendering a volumetric image display from the entire dataset, the data is optionally preprocessed in the image generation system 14. The image generation system 14 may therefore include data preprocessing modules for any desired preprocessing of the data, such as automatic segmentation, clipping, compression, conversion of format, deconvolution, resampling, normalizing, or the like at 16. It should be recognized that as it is desired to utilize all available data, data compression or other techniques that result in a loss of data are not necessary. The raw or preprocessed data is input to imaging software at 18, and a software and/or hardware based volume rendering system 20 is used to generate volumetric multi-dimensional image data. The volume rendering system 20 may be adaptive such that, for large data sets, image processing hardware is heavily relied upon and, for smaller data sets, image processing software is relied upon more than image processing hardware. Based on the characteristics of the data, the use of hardware and software is optimized for processing the data and rendering volumetric images in real time. A hardware based stereoscopic image is generated at 22 from the volume rendering system 20.

Once the volumetric image data is used to generate stereoscopic image data, this information is selectively coupled to one or more local stereoscopic display systems at 24 and/or to one or more remote stereoscopic display systems at 26. The at least one remote system 26 may be coupled via any suitable network 28, such as the Internet for remote stereoscopic user interaction, analysis and data and display manipulation. Further, it should be understood that one or more remote systems 26 may be at the same or different locations. In this way, the system and methods of the invention may allow multiple users to view the image data simultaneously, either at the same or different locations, allowing the users to collaborate and interact with the image data in a very efficient and meaningful manner. One or more local systems 24 may also be used for stereoscopic user interaction, analysis and data and display manipulation.

Figure 2:
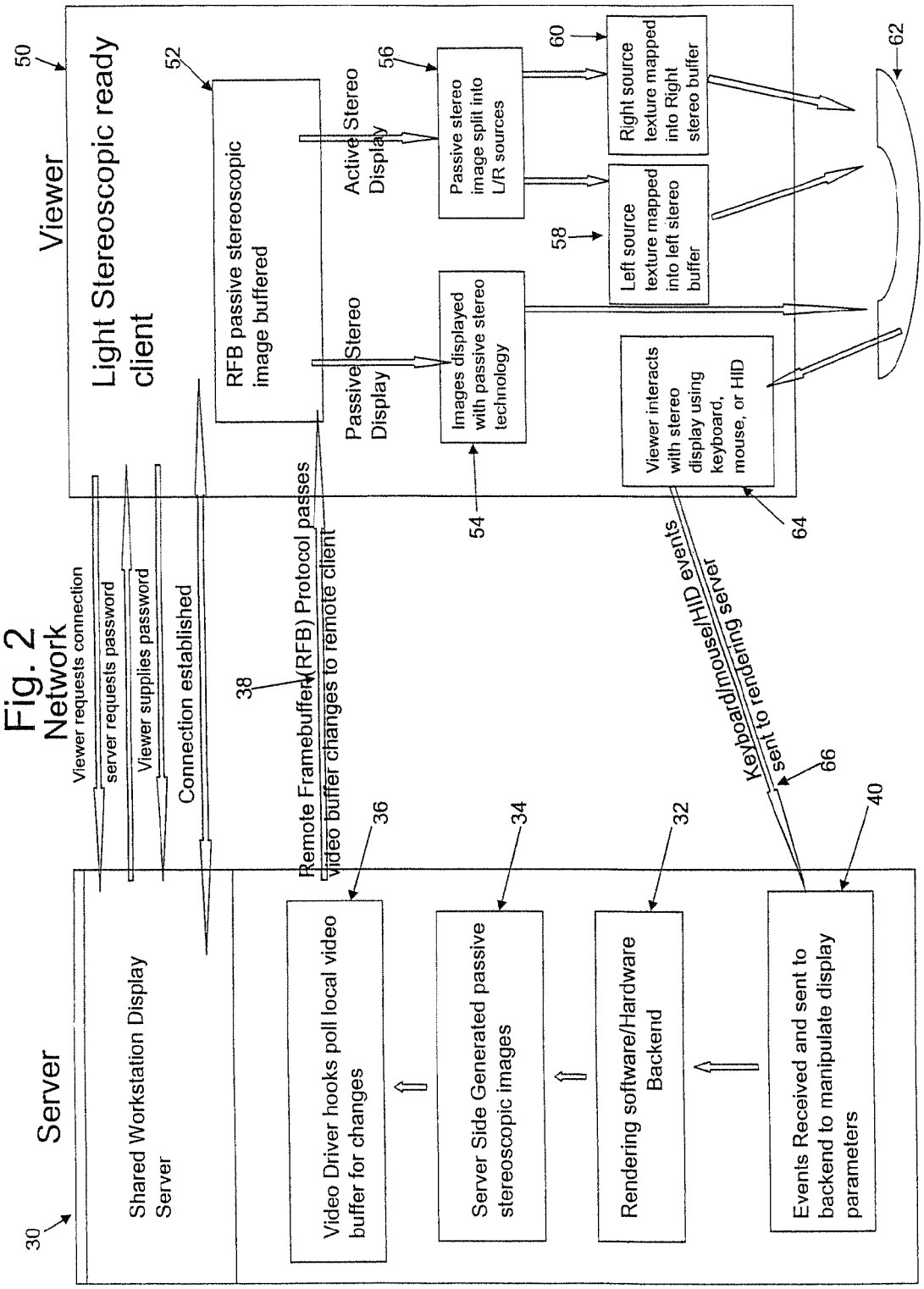
FIG. 2 illustrates an exemplary functional block diagram of a second embodiment of a real time volume rendering system.

As will be described further with respect to FIG. 2, the system 10 of an embodiment of the present invention, may divide processing and handling of the very large datasets apart from the stereoscopic display and manipulation functions with which the user interacts. FIG. 2 illustrates an exemplary functional block diagram of a second embodiment of a real time volume rendering system. The image generation system 14 shown in FIG. 1 may comprise a shared display server 30 having various hardware and software functions for generating stereoscopic image display information for use by the local and/or remote display system 24 or 26 as shown in FIG. 1. As seen in FIG. 2, the server 30 has a rendering software/hardware backend 32 which is adapted to render volumetric image data from volumetric datasets, whether such datasets are representative of raw volumetric data or preprocessed volumetric data.

As an example, the rendering software/hardware backend 32 is a video processing unit having predetermined processing capabilities for rendering video image data from the large datasets contemplated. A suitable processing unit for use in the invention is a graphics processing unit produced by Nividia or the VolumePro 1000D hardware rendering PCIX graphics card equipped with 4 GB internal memory produced by TeraRecon, Inc. of San Mateo, Calif. The volume rendering video card may be used in conjunction with volume rendering software/hardware if desired, and customized software may be provided in an embodiment of the invention. Alternatively, the Amira visualization software package produced by TGS, Inc. of Richmond, Tex. may be usable.

The rendering software/hardware backend 32 provides for generation of server side passive stereoscopic images at 34 which are stored in a local video buffer and selectively coupled to a stereoscopic viewer thin client 50. For real time viewing of the multi-dimensional passive spectroscopic images, the video driver associated with the rendering software/hardware backend 32 may be configured with hooks to poll the local video buffer at 36 for any requested changes in the display parameters, which are immediately implemented by the backend 32 to be stored in the local video buffer for selectively passing to the viewer client. In an embodiment, the image display generated by the server side 30 is coupled to the viewer client 50 by means of a remote framebuffer protocol (RFB) at 38 to pass the image data to the thin client 50 for viewing by a user. The system provides the ability to render volumetric image data and manipulate such image data in real time.

If desired or necessary based on the format or other characteristics of the volumetric image data, the data may be preprocessed in the server side system 30 before or after rendering of the stereoscopic volumetric images. Preprocessing may use various schemes for converting the data into a different format, modifying the data into a different form, for segmentation or partitioning of the data, or other suitable processing steps to prepare the data for rendering, communication, or other purposes. Such preprocessing steps will depend on the nature of the volumetric data, and particular hardware and/or software components of the system. For example, compression/decompression encoding schemes may be applied to the data if desired, and filtering or automatic segmentation of the data may be performed prior to passing the data to the viewer client. For example, the software may provide for image segmentation via an editor for real-time 3D control of the segmentation process.

The backend 32 may also support time-dependant data for true four-dimensional (4D) visualization of the volumetric data. The ability to provide 4D image display may be coupled with pre-processing techniques to automatically present the volumetric images to the viewing client 50 in a predetermined form with time-dependant images presented for display with the time-dependency selected by a user via a suitable HID.

The viewer client 50 is a thin client that does not need substantial processing power for rendering the volumetric spectroscopic images, but instead receives the image data after such processing has been performed on the server side 30. As seen in FIG. 2, the viewer client 50 is provided with the RFB passive spectroscopic image data and stores such image data in a suitable local buffer at 52. From the buffered images at 52, the viewing client 50 may be configured to display the images with passive stereo technology at 54.

Alternatively, or in addition, the passive stereo image data is split into left and right eye source images at 56 for an active stereo display. In this event, the left/right sources are then mapped into a left source stereo buffer at 58 and a right source stereo buffer at 60. With either the passive stereo display or an active stereo display, the images are then sent to a passive or active stereo viewer 62.

In an embodiment, a passive viewer may be a high resolution CRT, LCD display or other suitable display device viewed with a suitable 3D viewing system such as stereo-viewing glasses worn by a user. For an active stereo display, the left and right stereo images are synchronized and sent to an active stereo display worn by the user, such as stereo display glasses on which the left and right images are sequentially displayed. For example, a suitable active display system is the CrystalEyes active stereo display system and glasses, such as sold by Vrlogic GmbH for example. Such systems may use a quad-buffered frame-sequential stereo display mode used to drive LCD shutter glasses with a CRT display, LCD, projection or other suitable system. Quad-buffered frame-sequential stereo may be provided with the viewing client 50 for use with an active display, to provide separate left and right eye frame buffers for such an active display, and providing true stereoscopic viewing of the image data.

The user, via a suitable HID associated with client 50, also has the capability to manipulate the images being coupled to the viewer client 50 in real-time. As used herein, the term "real time" refers to an almost immediate response, such as a user perceiving an almost immediate response when the user manipulates the image or performs image analysis via the HID. The user interacts with the stereo display using an interface such as a keyboard, mouse, or any other suitable HID at 64. As an example to facilitate simplified use of the system, a touchscreen interface or the like may be provided in association with the viewer client 50, to select areas of the displayed images to be manipulated or to select items from displayed menus for alternative command input and display manipulation. The HID events are sent at 66 to the rendering server 30 and received at 40. Such events are sent to the backend 32 to manipulate the display parameters and forward the video buffer changes to the viewer client 50 in real time.

As mentioned previously, the video driver associated with the server 30 polls the local video buffer for changes at 36 before sending on the generated passive stereoscopic images to the viewer client 50. The display parameters may be modified in any variety of ways by the user to achieve the desired display of volumetric spectroscopic images to evaluate, analyze, measure or otherwise use the images for gaining desired information form the volumetric data. In this way, the user may manipulate the stereo images provided to the viewer client to provide simple and desired visual navigation through the images.

Such manipulation of display parameters allow the user to rotate the image, zoom in or out, perform dimensional measurements between structures or along surfaces, segment image information, change color or opacity transfer functions, or a wide variety of other variation in the displayed images. This provides the user with a real-time visual navigation interface for use and access to the resolution capabilities of the server generated passive stereoscopic images using the extent of the large volume of volumetric data supplied to the system. The interface thus allows for volume navigation of the data through real-time interaction with the user(s).

For use in viewing medical imaging data for example, the system of an embodiment of the present invention provides for real-time volume rendering and manipulation for viewing on the viewer client for advanced diagnosis, analysis, or operational tool in the detection or treatment of disease. Similarly, in other volumetric systems, such as digital microscopy, weather system imaging, seismic or other volumetric geological data, video entertainment or virtual reality systems, the ability to utilize all available data to achieve very high resolution while providing for real time manipulation by a user in real time greatly enhances the ability to effectively use and/or evaluate such data.

Figure 3:
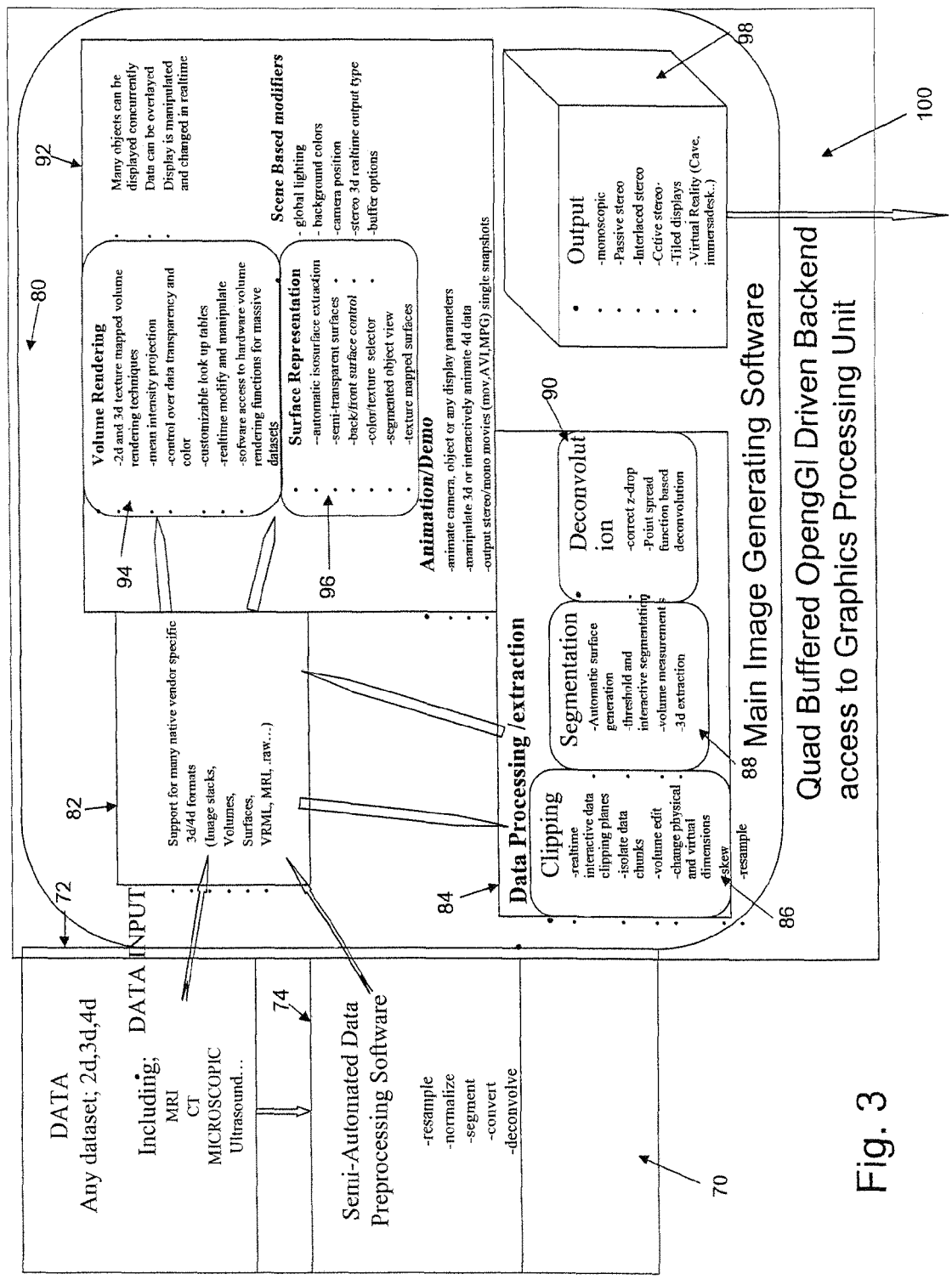
FIG. 3 illustrates an exemplary functional block diagram of an embodiment of the software of the stand-alone platform of the system of FIG. 1 or FIG. 2.

Turning to FIG. 3, operation of an embodiment of the system will be described. FIG. 3 illustrates an exemplary functional block diagram of an embodiment of the software of the stand-alone platform, such as a computer-based platform, of the system of FIG. 1 or FIG. 2. The imaging server as previously described may have auxiliary processing software at 70, to which the dataset, being any 2D, 3D or 4D dataset, is supplied to the system at 72. Pre-processing may be performed if desired or needed, by semi-automated data preprocessing software at 74. Either the raw data or preprocessed data is then forwarded to the imaging software system 80 and a data input system at 82. The system 82 supports any desired data format or structures for handling in the system, such as 3D or 4D vendor specific data forms including image stacks, volumes, surfaces VRML, DICOM, raw, image stacks, VTK or any other data. That is, the system can automatically read or load any volumetric data to be imaged. As used in this context, the term "automatically" means without significant user intervention and without having to first convert the data to some common format. The data is then processed or extracted if needed via a data processing/extraction sub-system 84, where any desired processing of the data may be performed prior to image generation.

In the embodiment shown in FIG. 3, such processing may be of different characteristics. A clipping sub-system 86 may provide desired clipping features and manipulation of the data. For example, real-time interactive data clipping procedures can be selected by the user, such as for data clipping planes, isolation of data chunks or groups, volume editing, changing of the physical and virtual dimensions in the displayed images, skewing of the data, or data resampling, as examples. A segmentation sub-system 88 may be provided for performing processes such as automatic surface generation, threshold and interactive segmentation, volume or distance measurement and/or 3D extraction techniques as examples.

Further, although embodiments of the present invention may alleviate the need to deconvolve data for handling thereof due to the large volume of data, it may still be desirable to perform deconvolution processing for various applications at 90. Such processing may include correction of z-drop or point spread function based deconvolution, for example. If data processing is performed at 84, the processed data is then supplied back to the data input module at 82 for subsequent image generation via an image generation module 92.

The image generation module 92 may perform various functions as desired for a particular application, including for example, volume rendering at 94. This can include 2D and 3D texture mapped volume rendering techniques, mean intensity projection, control over data transparency and color, the use of customizable look up tables, real-time image modification and manipulation, software access to hardware volume rendering functions for massive datasets, or any other desired image generation characteristics.

The image generation module 92 may also provide for surface representation generation at 96. For example, procedures such as automatic iso-surface extraction, the use of semi-transparent surfaces, back/front surface control, surface color/texture selection, surface reflection/lighting segmented object viewing or the creation of texture mapped surfaces may be provided.

The image generation module 92 may also perform other display generation processing such as for the display of many objects concurrently, for the overlay of data in images and/or for manipulating display parameters in real-time. Additional features, such as the provision and use of scene based modifiers may also be provided. These may include for example, global lighting features, background colors, camera position, stereo 3D real-time output type or buffer options.

Also, the system 92 may provide for features for animation of the data, such as animating the camera, object or any other display parameters, manipulation of the 3D image and/or the interactive animation of 4D data, the output of stereo or mono movies and snapshots of the image data for example. Once generated the rendered image data is output at 98 in a desired form. These forms may include for example, monoscopic, passive stereo, interlaced stereo, active stereo, tiled displays and virtual reality displays. As previously mentioned, the imaging software system 80 interacts with the hardware systems on the server side via a quad buffered OpenGl driven backend for active stereo viewing as an example, that has access to the graphics processing unit at 100. For passive stereo viewing, such hardware is not necessary.

Figure 4:
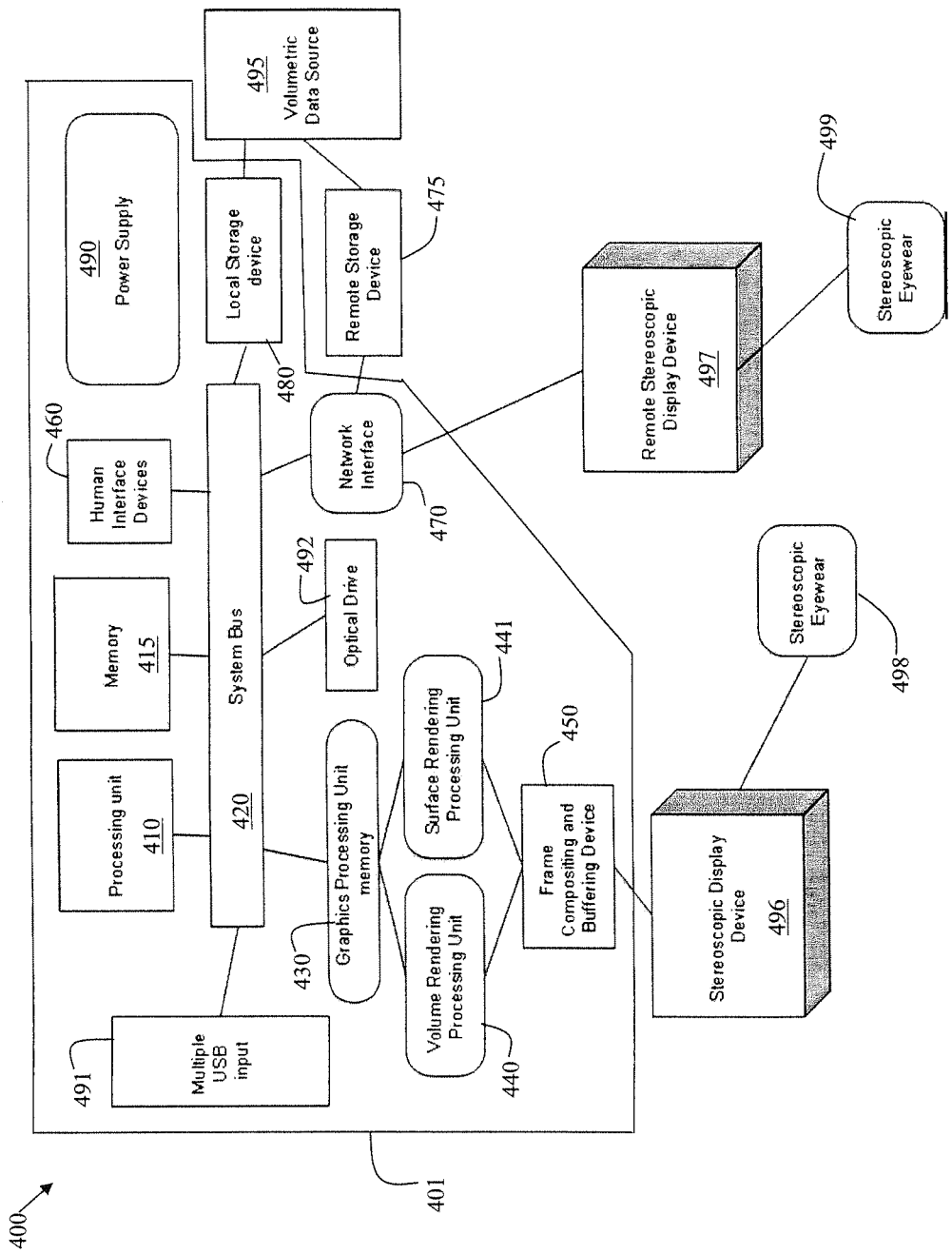
FIG. 4 illustrates an exemplary schematic block diagram of an embodiment of the hardware of a stand-alone platform within a system.

FIG. 4 illustrates an exemplary schematic block diagram of an embodiment of the hardware of a stand-alone platform 401 within a system 400. The stand-alone platform 401 includes a processing unit 410 adapted to read one or more volumetric data sets corresponding to one or more modes or channels of volumetric data formats, and to extract volumetric data from the data sets. The volumetric data sets are derived from at least one volumetric data source 495 such as an optical disk or compact disk, for example. A mode, as used herein, refers to an imaging mode such as, for example, X-ray or MRI. The term "multi-modal" as used herein refers to one or more modes, or the capability to process data from one or more modes. A channel, as used herein, refers to a channel of data such as, for example, an immunohistochemically stained color channel of data obtained from a confocal microscope. The term "multi-channel" as used herein refers to one or more channels, or the capability to process data from one or more channels.

The processing unit 410 is adapted to extract fully acquired volumetric data from the data sets. As used herein, the term "fully acquired" refers to all of the volumetric data that was acquired upon acquisition such as, for example, via a medical imaging system, as opposed to interpolated data or sampled data forming a reduced data set. As a result, the fully acquired volumetric data includes all of the information in, and the highest resolution of, the data set at the time of acquisition.

The stand-alone platform 401 also includes a system bus 420 providing communication and data transfer between certain various subsystems and components of the stand-alone platform 401. For example, the stand-alone platform 401 further includes a memory 415 operationally connected to the processing unit 410 via the system bus 420. The processing unit 410 and the memory 415 are used, for example, to extract and spatially register multiple modes of the volumetric data.

The stand-alone platform 401 includes a graphics processing unit memory 430 operationally connected to the system bus 420 and adapted to receive the fully acquired volumetric data from the processing unit 410 via the system bus 420. The stand-alone platform 401 further includes at least one graphics processing unit 440 and/or 441 operationally connected to the graphics processing unit memory 430 and adapted to render multi-dimensional (e.g., 2D, 3D, 4D) image data from the fully acquired volumetric data in real time. The graphics processing unit 440 may be dedicated to volume rendering, for example. The graphics processing unit 441 may be dedicated to surface rendering, for example. Alternatively, both of such functions may be performed by a single graphics processing unit.

A frame compositing and buffering device (hardware or software) 450 is operationally connected to the graphics processing unit 440 and/or 441 and is adapted to buffer frames of the rendered multi-dimensional image data and output the buffered frames for display in real time. The display device 496, for example, may be operationally connected to the frame compositing and buffering device 450 and is adapted to display the rendered multi-dimensional image data in real time. The display device 496 may or may not be considered part of the stand-alone platform 401. The display device 496 and/or 497 may be used with passive or active stereoscopic eyewear 498 or 499, for example, for viewing rendered stereoscopic images as described previously herein.

The processing unit 410 may be further adapted to co-register the fully acquired volumetric data to a common spatial coordinate system before passing the fully acquired volumetric data to the graphics processing unit memory. For example, if the volumetric data sets include magnetic resonance imaging (MRI) data from a first medical imaging mode (i.e., MRI) in one data set and positron emission tomography (PET) data from a second medical imaging mode (i.e, PET) in another data set, the processing unit 410 is capable of reading both data sets, extracting the fully acquired volumetric data from both data sets, and registering both the MRI and PET volumetric data to, for example, a common spatial and/or temporal coordinate system (e.g., 3D or 4D). As a result of such registration, voxels of both the MRI data and the PET data will be properly spatially and/or temporally represented with respect to each other.

The stand-alone platform 401 also includes at least one human interface device (HID) 460 operationally connected to the system bus 420 and adapted to interactively initiate real time manipulation, modification, and analysis of the rendered multi-dimensional image data. The HID 460 may include, for example, any of a computer mouse, a joy stick, a touch-screen panel, a keyboard, a voice-activated command device, a tracked virtual reality device such as a pinch glove or v-wand for example or any other type of HID useful for providing real time interaction with the displayed image data. As previously stated herein, real time refers to providing an almost immediate response. In accordance with another embodiment of the present invention, the HID 460 is not considered part of the stand-alone platform 401 but is instead considered a system component which interfaces to the stand-alone platform 401 via any one of a plurality of possible interfaces provided by the stand-alone platform 401.

In accordance with an embodiment, the stand-alone platform 401 includes a network interface 470 operationally connected to the system bus 420 and adapted to communicatively interface with a remote storage device 475 and a remote display subsystem 497. For example, the network interface 470 may provide connection to the Internet allowing rendered multi-dimensional image data to be displayed at the remote display device 497 and allowing volumetric data sets to be read from the remote storage device 475.

In accordance with an embodiment of the present invention, the stand-alone platform 401 includes a local storage device 480 capable of storing the volumetric data sets read from the volumetric data source 495. The volumetric data sets may be loaded into the local storage device 480 or the remote storage device 475 from the volumetric data source 495. The stand-alone platform 401 may further include a power supply 490, universal serial bus (USB) inputs 491, and an optical drive 492, for example. The stand-alone platform 401 may include other PC-related hardware as well, in accordance with various embodiments.

A system configuration 400, in accordance with an embodiment of the present invention, includes the stand-alone platform 401 adapted to render multi-dimensional image data in real time from a plurality of fully acquired volumetric data sets corresponding to a plurality of multi-modal or multi-channel volumetric data formats derived from at least one volumetric data source 495, at least one display subsystem 496 operationally connected to the stand-alone platform 401 and adapted to display the rendered multi-dimensional image data in real time, and at least one HID 460 operationally connected to the stand-alone platform 401 and adapted to provide interactive real time manipulation and modification of the rendered multi-dimensional image data. In accordance with an embodiment, the HID 460 is further adapted to provide interactive real-time quantitative analysis of the rendered multi-dimensional image data. The display subsystem 496 may include a high resolution display (e.g., a CRT) operationally connected to the stand-alone platform 401 at the frame compositing and buffering device 450 for displaying the rendered multi-dimensional image data.

The system configuration 400 may further include stereoscopic eyewear 498 which may be active or passive. If active, the stereoscopic eyewear 498 is wired or wirelessly connected to and synchronized with the display subsystem 496 and adapted to provide active stereoscopic viewing of the displayed rendered multi-dimensional image data in real time to a user wearing the active stereoscopic eyewear 498. If passive, the stereoscopic eyewear 498 is adapted to provide passive stereoscopic viewing of the displayed rendered multi-dimensional image data in real time to a user wearing the passive stereoscopic eyewear 498.

Another system configuration, in accordance with another embodiment of the present invention, includes the stand-alone platform (e.g., 401 or 30) adapted to render multi-dimensional image data in real time from a plurality of fully acquired volumetric data sets corresponding to a plurality of multi-modal or multi-channel volumetric data formats derived from at least one volumetric data source 495, and at least one remote thin client viewer 50 operationally connected to the stand-alone platform and adapted to receive the rendered multi-dimensional image data from the stand-alone platform in real time using a remote frame buffer (RFB) protocol, and adapted to display the rendered multi-dimensional image data in real time. The system configuration also includes at least one HID at 64 operationally connected to the remote thin client viewer 50 and adapted to initiate interactive real time manipulation and modification of the rendered multi-dimensional image data upon activation of the HID by a user. The manipulation and modification is accomplished when the remote thin client viewer sends an event command to the stand-alone server platform 401 in real time in response to the HID activation. The rendered multi-dimensional image data is updated by the stand-alone platform in real time in response to the event command and the stand-alone platform sends the updated rendered multi-dimensional image data to the remote thin client viewer in real time using the RFB protocol. The updated rendered multi-dimensional image data is displayed by the remote thin client viewer in real time.

Again, the system configuration may include active or passive stereoscopic eyewear such that the active stereoscopic eyewear is wire or wirelessly connected to and synchronized with the thin client viewer. In accordance with an embodiment, the thin client viewer 50 includes a buffer memory device at 52 for accepting the rendered multi-dimensional image data from the stand-alone platform, and a high resolution display operationally connected to the buffer memory device for displaying the rendered multi-dimensional image data.

In accordance with an embodiment, the HID at 64 is further adapted to initiate interactive real time quantitative analysis of the rendered multi-dimensional image data upon further activation of the HID by a user. The quantitative analysis is accomplished when the remote thin client viewer 50 sends a further event command to the stand-alone platform in real time in response to the further activation of the HID. The quantitative analysis is performed by the stand-alone platform in real time in response to the further event command to generate quantitative metrics. The stand-alone platform sends the quantitative metrics to the remote thin client viewer in real time using the RFB protocol. The quantitative metrics is displayed by the remote thin client viewer along with the rendered multi-dimensional image data in real time. In an example, the quantitative analysis may also be used to compare temporal changes in metrics/parameters of the data in 3D and/or 4D data sets. Also, in multi-modal data sets as will be described in more detail, it is possible to compare co-localization of data (ie., in microscopy, the presence of multiple proteins in a cell with each represented by a single channel or changes in medical image data within a specific anatomical regions with the data).

Figure 5:
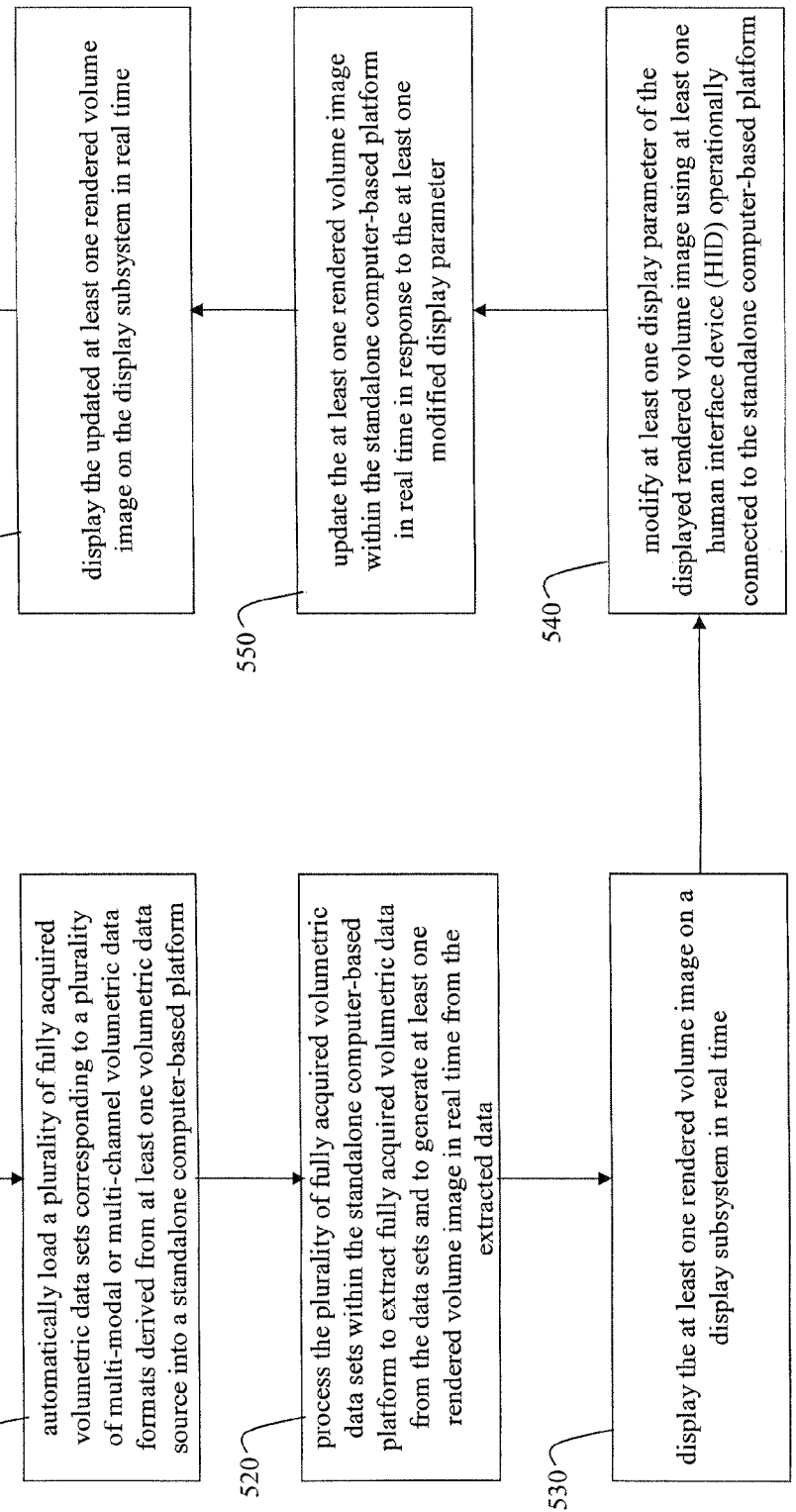
FIG. 5 illustrates a flowchart of an exemplary embodiment of a method 500 for the multi-dimensional rendering, display, manipulation, and analysis of full high resolution volumetric data sets.

FIG. 5 illustrates a flowchart of an exemplary embodiment of a method 500 for the multi-dimensional rendering, display, manipulation, and analysis of full high resolution volumetric data sets. In step 510, automatically load a plurality of fully acquired volumetric data sets corresponding to a plurality of multi-modal or multi-channel volumetric data formats derived from at least one volumetric data source into a stand-alone platform. In step 520, process the plurality of fully acquired volumetric data sets within the stand-alone platform to extract fully acquired volumetric data from the data sets and to generate at least one rendered volume image in real time from the extracted data. In step 530, display the at least one rendered volume image on a display subsystem in real time. In step 540, modify at least one display parameter of the displayed rendered volume image using at least one human interface device (HID) operationally connected to the stand-alone platform. In step 550, update the at least one rendered volume image within the PC-based sever platform in real time in response to the at least one modified display parameter. In step 560, display the updated at least one rendered volume image on the display subsystem in real time. The at least one rendered volume image may include a stereoscopic pair of volumetric images. The processing step may include registering the extracted fully acquired volumetric data to a common spatial and/or temporal coordinate system.

In accordance with an embodiment, modifying at least one display parameter results in at least one of an orientation change of the at least one rendered volume image, a color transfer function change of the at least one rendered volume image, an opacity transfer function change of the at least one rendered volume image, and a segmenting of the at least one rendered volume image.

The method 500 may include other steps as well. For example, the method 500 may further include selecting and displaying an iso-surface of the rendered volume image in real time. The method 500 may also include performing real time navigation through the rendered volume image.

The method 500 may further include performing real time interactive quantitative analysis of the rendered volume image. For example, a user may designate a first point within the rendered volume image using the HID. The user may then designate a second point in the rendered volume image using the HID. A straight line or curved distance may then be computed between the first point and the second point in real time, giving the user a true measurement of the actual distance between the two designated points. Similarly, the method 500 may also include drawing a probing line or curve through the rendered volume image in real time such that various measurements may be made along the probing line or curve, such as an iso-surface in the data. As another example, a user may segment out a portion of the rendered volumetric image using the HID in real time and command the system to compute a volume or surface area of the segmented portion in real time.

In accordance with an embodiment, the stand-alone platform 401 is capable of automatically re-configuring a combination of active image processing and rendering hardware and software components based on at least one characteristic of the volumetric data sets to be processed. The at least one characteristic may include one or more of a byte size of the volumetric data sets, a number of the volumetric data sets, a number of different modalities included in the volumetric data sets, and a number of dimensions included in the volumetric data sets, or other data set characteristics for example.

For example, for very large data sets, the vast majority of the image processing rendering may be performed in hardware (e.g., a graphics processing unit), with software used simply for accessing the hardware capabilities in a user friendly and efficient manner. For smaller data sets, the vast majority of the image processing rendering may be performed in software using the processing unit 410, for example. Furthermore, image process rendering may be allocated between hardware components. For example, volume rendering may be handled by a first video card 440 and surface rendering may be handled by a second video card (GPU) 441. As a result, the stand-alone platform 401 is flexible in how rendering is accomplished in dependence on the nature or characteristics of the actual data to be processed. The determination of the hardware and software functions relating to a particular data set or sets, may be optimized automatically, or without significant user intervention, based upon processing characteristics of the hardware and/or functions of the software.

Figure 6:
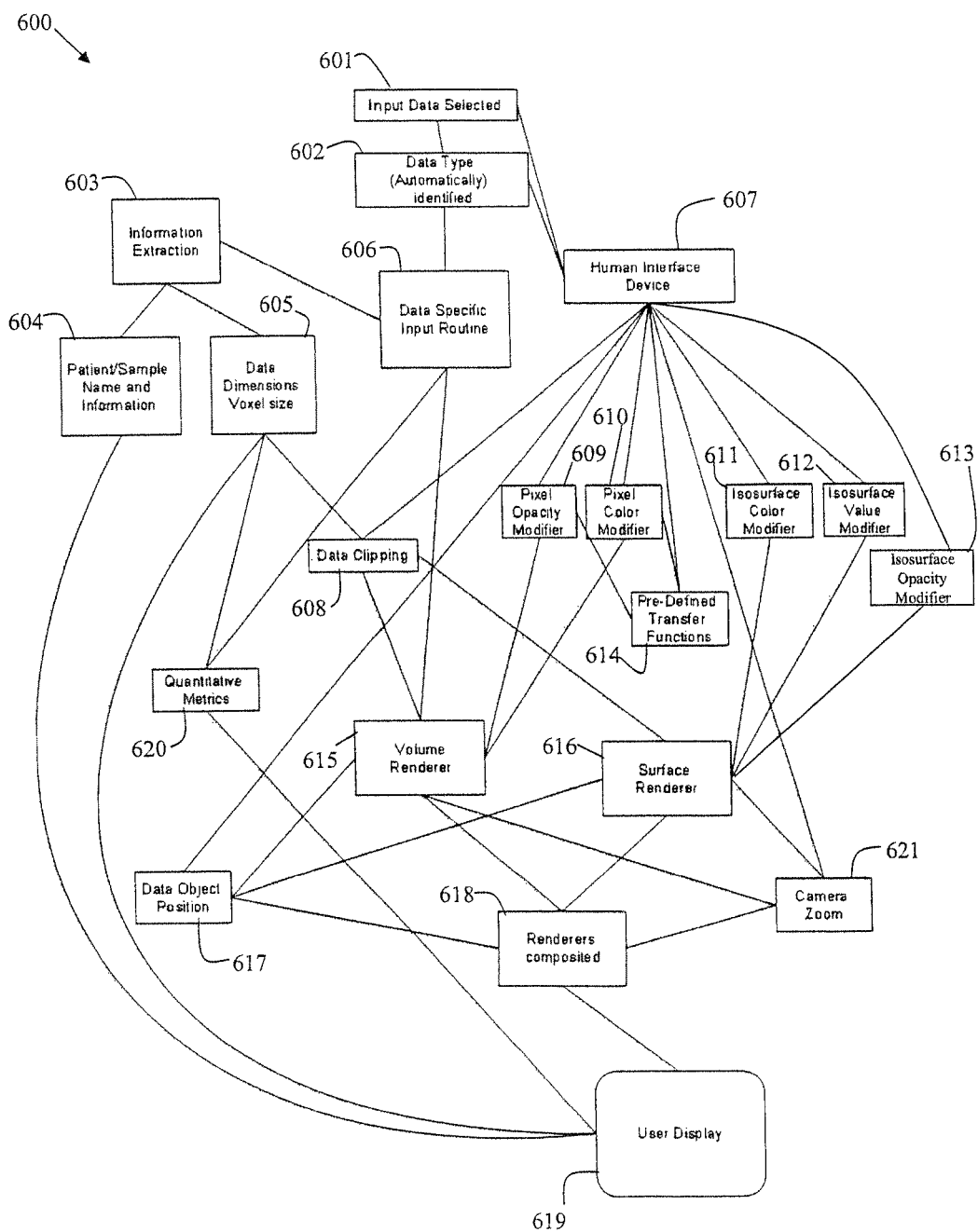
FIG. 6 illustrates an exemplary functional data flow diagram of the volume rendering operation of the volume rendering system of FIG. 1.

FIG. 6 illustrates an exemplary functional data flow diagram 600 of the volume rendering operation of the volume rendering system 10 of FIG. 1. A user selects input data (i.e., at least one volumetric data set) at 601. At 602, the volumetric data set is automatically identified and read without the user having to tell the system the format or any other information about the volumetric data set. At 603, information is extracted from the read volumetric data sets (e.g., patient/sample name and information at 604 and data dimensions and voxel size at 605). A data specific input routine may be performed on volumetric data sets at 606 such as, for example, registering multiple modalities (modes) of the volumetric data sets to a common spatial and/or temporal coordinate system.

At 607, a user may interact with the system via a human interface device (HID) in order to perform, for example, data clipping at 608, pixel opacity modification at 609, pixel color modification at 610, iso-surface color modification at 611, iso-surface value modification at 612, iso-surface opacity modification at 613, data object positioning at 617, and camera zooming at 621. Pixel color and opacity may be initially defined by pre-defined transfer functions at 614 in the form of color maps and opacity maps.

Volume rendering is performed at 615 and surface rendering is performed at 616. Frame compositing and buffering is performed at 618. Displaying of image data is performed at 619. Quantitative metrics may be obtained from the displayed image data at 620.

FIG. 7 illustrates an exemplary embodiment of a displayed rendered volume image 710 generated by the volume rendering system of FIG. 1. The image 710 is a 3D volumetric section of a brain. A color transfer function display mapping is shown at 720 and an opacity transfer function display mapping is shown at 730. These mappings may be modified by the user via the HID, such as by movement of a slider tool 732 as represented for each transfer function 730, which is selectively movable between minimum and maximum settings. Other rendering and display options (e.g., stereo options and image modification options) are shown at 740. A user may interact via the HID to rotate the image 710, zoom in or out on the image 710, segment the image 710, modify the color and/or opacity transfer functions applied to the image 710, etc.

Figure 8:
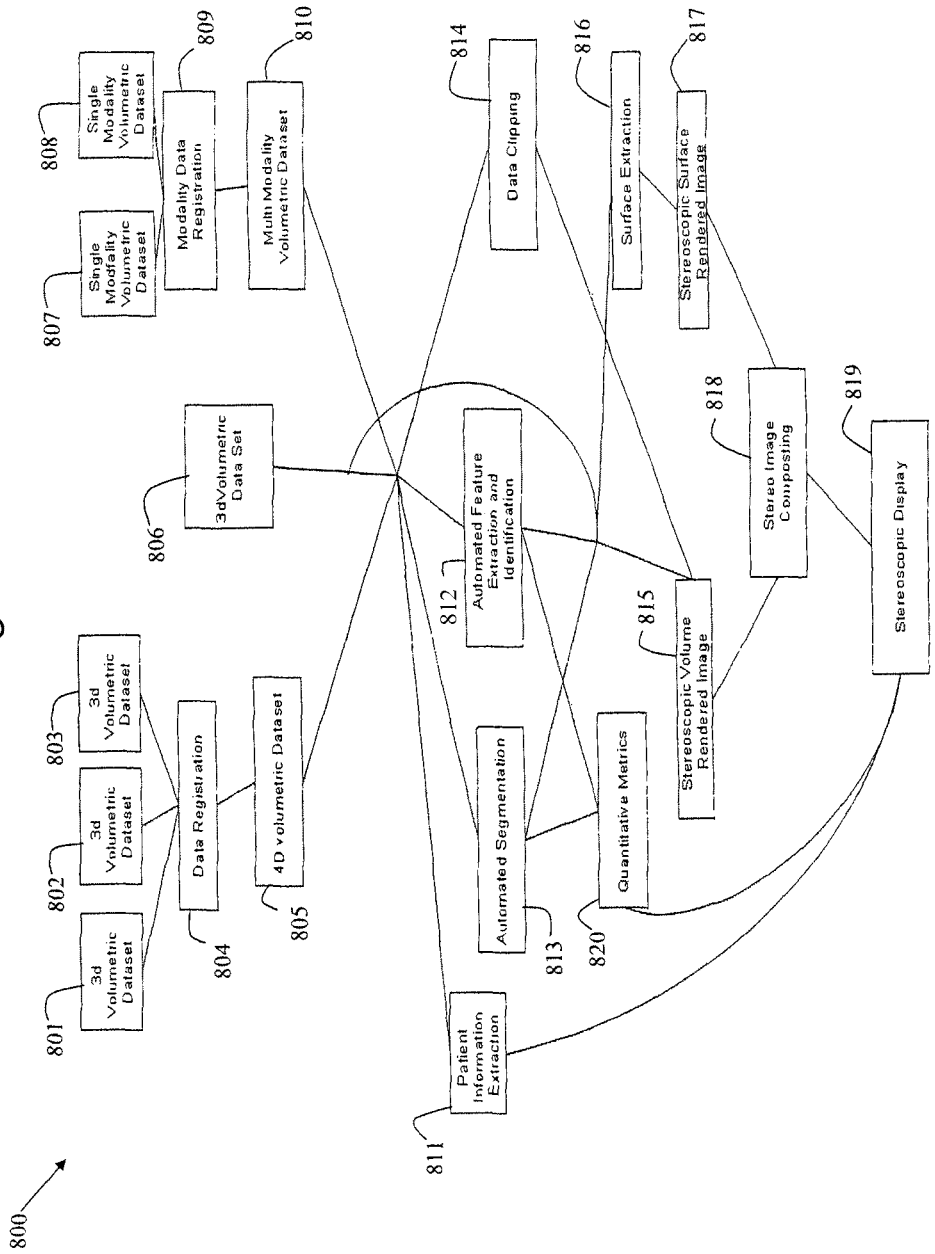
FIG. 8 illustrates an exemplary first embodiment of a functional data flow diagram showing the various plurality of data types and modalities that may be handled by the stand-alone platform of FIG. 3 and FIG. 4 for volumetric image rendering.

FIG. 8 illustrates an exemplary first embodiment of a functional data flow diagram 800 showing the various plurality of data types and modalities that may be handled by the stand-alone platform of FIG. 3 and FIG. 4 for volumetric image rendering. Three volumetric data sets of the same modality are shown at 801, 802, and 803 which are successive data sets acquired in time. The data sets are temporally registered to each other at 804 and a composite 4D (3 spatial dimensions and a time dimension) volumetric data set is formed at 805. Similarly, a single 3D volumetric data set corresponding to a single modality at a single time is shown at 806.

A volumetric data set of a first modality is shown at 807 and a volumetric data set of a second modality is shown at 808. The data sets are spatially registered to each other at 809 and a composite 3D multi-modality volumetric data set is formed at 810. In this example, the fully acquired data sets of each of the modalities is used in the composite data set at 810.

Patient information may be extracted from any of the data sets (at 805, 806 and 810) at 811, and automated feature extraction and identification may be performed at 812. Similarly, automated segmentation of the data sets may be performed at 813 and data clipping may be performed at 814.

Stereoscopic volume rendering may be performed at 815. Surface extraction may be performed at 816 and stereoscopic surface rendering of the extracted surface may be performed at 817. Stereoscopic frame compositing and buffering is performed at 818. Stereoscopic displaying is performed at 819. Quantitative metrics may be obtained from the displayed stereoscopic image data at 820.

Figure 9:
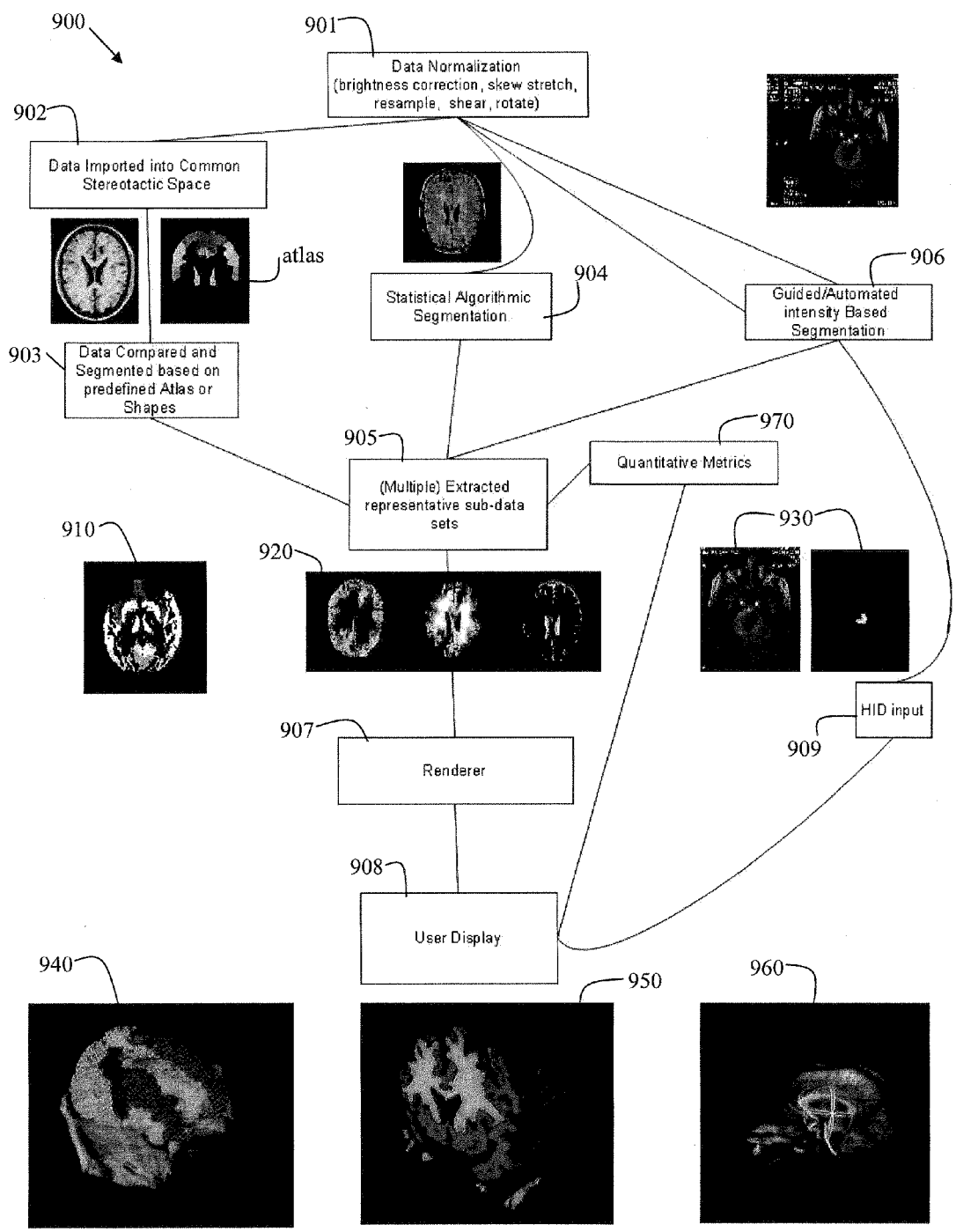
FIG. 9 illustrates an exemplary functional data flow diagram showing various types of automated segmentation that may be provided by the volume rendering system of FIG. 1 or FIG. 2.

FIG. 9 illustrates an exemplary functional data flow diagram 900 showing various types of automated segmentation 813 that may be provided by the volume rendering system of FIG. 1 or FIG. 2. Data normalization is performed on the volumetric data at 901 (e.g., brightness correction, skew correction, stretch, re-sampling, shear, rotate).

In a first type of automated segmentation, volumetric data is imported into a common stereotactic space at 902 and is compared and segmented based on a pre-defined atlas or shapes at 903. Only those segments of volumetric data 910 corresponding to the atlas are extracted at 905. In a second type of automated segmentation, statistical algorithmic segmentation is performed on the volumetric data at 904, and multiple representative sub-data sets 920 are extracted at 905. In a third type of automated segmentation, guided/automated intensity based segmentation is performed on the volumetric data at 906 based on user input selection of intensity at 909, and multiple representative sub-data sets 930 are extracted at 905.

Volume rendering of the segmented data is performed at 907 and image displaying is performed at 908. A displayed rendered composite image of the segmented data 910 is shown at 940, a displayed rendered composite image of the segmented data 920 is shown at 950, and a displayed rendered composite image of the segmented data 930 is shown at 960. For each of these transfer functions characteristics, an example image and the results of the application of the transfer function is shown in FIG. 9. It should also be recognized that segmented data can be overlayed on the original data to provide further insights into relationships between segmented and nonsegmented data.

Figure 10:
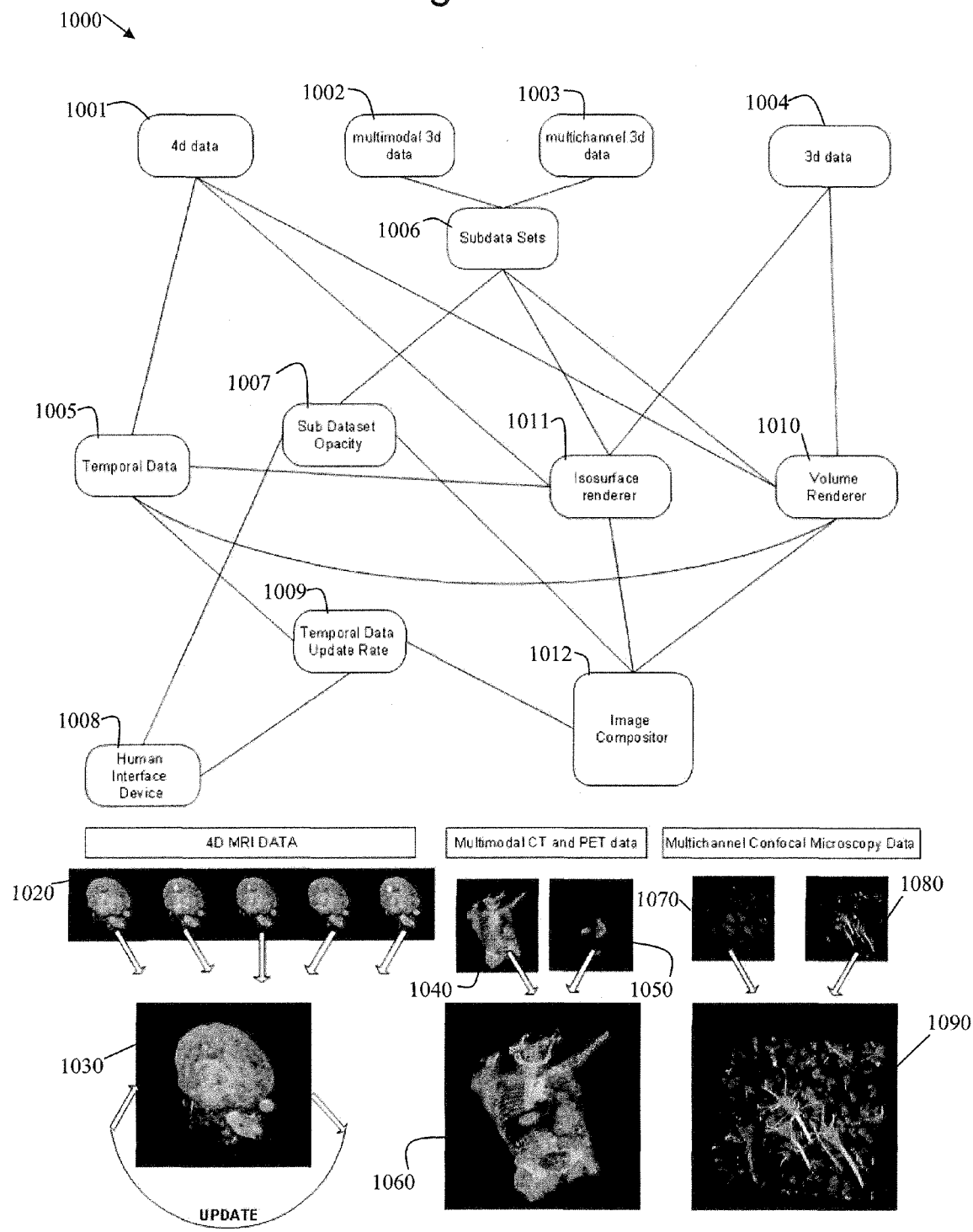
FIG. 10 illustrates an exemplary second embodiment of a functional data flow diagram showing the various plurality of data types and modalities that may be handled by the stand-alone platform of FIG. 3 and FIG. 4 for volumetric image rendering.

FIG. 10 illustrates an exemplary second embodiment of a functional data flow diagram 1000 showing the various plurality of data types and modalities that may be handled by the stand-alone platform of FIG. 3 and FIG. 4 for volumetric image rendering. A 4D volumetric data set is shown at 1001, a multi-modal 3D volumetric data set is shown at 1002, a multi-channel 3D volumetric data set is shown at 1003, and a single mode 3D volumetric data set is shown at 1004.

The 4D volumetric data set is converted to registered temporal data at 1005. A temporal update rate of the registered temporal data is modified by a user at 1009 via the HID at 1008. For example, the 4D volumetric data set may correspond to 4D MRI data. Five temporal images of the MRI data are shown at 1020. A displayed rendered composite 4D image of the MRI data is shown at 1030.

The multi-modal 3D volumetric data sets are converted into sub-data sets at 1006 corresponding to the different modalities. Opacity or colors of the sub-data sets may be modified by a user at 1007 via the HID at 1008 via the appropriate transfer functions for example. As another example, the multi-modal 3D volumetric data sets may correspond to a CT data set shown as an image at 1040 and a PET data set shown as an image at 1050. A displayed rendered composite 3D image of the CT and MRI data is shown at 1060.

As a further example, the multi-channel 3D volumetric data sets may correspond to a first color of stained tissue imaged by a confocal microscope and shown as an image at 1070, and a second color of stained tissue imaged by a confocal microscope and shown as an image at 1080. A displayed rendered composite 3D image of the multi-channel 3D volumetric data is shown at 1090.

Volume rendering of any of the data sets is performed at 1010 and iso-surface rendering is performed at 1011. Frame compositing and buffering of rendered image data is performed at 1012.

In summary, systems and methods for the real time display, quantitation and manipulation of extremely large data sets using real time volume/surface rendering and display of volumetric data images (e.g., stereoscopic volumetric images) using all the acquired data from extremely large data sets are disclosed. The systems and methods provide the ability to volumetrically render images with extremely high resolution in applications such as medical imaging procedures, digital microscopy such as in use of a confocal microscope, and other areas where extremely large data sets are produced from the imaging process.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system providing multi-dimensional rendering and display of volumetric data sets, said system comprising:

a platform to render a plurality of fully acquired volumetric data sets received from a plurality of volumetric data sources, the plurality of fully acquired volumetric data sets including data related to at least a single volume and at least one set of fully acquired volumetric data received in real time;

a graphics processor to import said plurality of fully acquired volumetric data sets to a common coordinate space, and co-registering of the plurality of fully acquired volumetric data sets temporally with respect to each other such that the plurality of fully acquired volumetric data sets are properly temporally represented with respect to one another; and wherein co-registering the plurality of fully acquired volumetric data sets is performed without an interpolation process, at least one display system operationally connected to said platform to display said plurality of fully acquired volumetric data sets.

2. The system of claim 1, further comprising at least one human interface device (HID) operationally connected to said platform to provide interactive manipulation and modification of at least one of said plurality of fully acquired volumetric data sets in real time.

3. The system of claim 2, wherein said at least one human interface device (HID) enables a user to select at least one of a predetermined time and predetermined interval of said rendered volumetric image data.

4. The system of claim 3, wherein said at least one human interface device (HID) enables interactive quantitative analysis of said displayed rendered fully acquired volumetric image data.

5. The system of claim 2, wherein said at least one human interface device (HID) further comprises stereoscopic eyewear selected from the group consisting of an active stereoscopic eyewear connected to and synchronized with at least one stereoscopic display subsystem and adapted to provide active stereoscopic viewing of said displayed rendered volumetric image data in real time to a user wearing said active stereoscopic eyewear or a passive stereoscopic eyewear adapted to provide passive stereoscopic viewing of said displayed rendered fully acquired volumetric image data in real time to a user wearing said passive stereoscopic eyewear.

6. The system of claim 1, wherein said system to co-register the plurality of fully acquired volumetric data sets operates to register the fully acquired volumetric data sets to a common spatial coordinate system automatically or semi-automatically.

7. The system of claim 1, wherein said system to co-register the plurality of fully acquired volumetric data sets operates to preprocess the fully acquired volumetric data sets.

8. The method system of claim 1, further comprising at least one human interface device (HID), wherein said HID provides interactive quantitative analysis of said displayed rendered volume image from the plurality of fully acquired volumetric data sets.

9. The system of claim 1, further comprising a hardware portion of said graphics processor and a software portion of said graphics processor.

10. The system of claim 9, further comprising an optimization algorithm that selects at least a portion of a first set of fully acquired volumetric image data and a second set of fully acquired volumetric image data for processing by said hardware portion.

11. The system of claim 10, wherein said plurality of fully acquired volumetric data sets are purged from memory of the system after their display.

12. The system of claim 9, further comprising at least one volume processing unit and at least one surface processing unit of said hardware portion.

13. A method for multi-dimensional rendering and display of volumetric data sets, said method comprising:
receiving a plurality of fully acquired volumetric data sets from a plurality of volumetric data sources, the plurality of fully acquired volumetric data sets including data related to at least a single volume and at least one set of fully acquired volumetric data received in real time;
processing said plurality of fully acquired volumetric data sets within a platform to generate at least one rendered volume image from said fully acquired volumetric data sets;
co-registering of the plurality of fully acquired volumetric data sets temporally with respect to each other such that the plurality of fully acquired volumetric data sets are properly temporally represented with respect to one another, and wherein co-registering the plurality of fully acquired volumetric data sets is performed without an interpolation process; and
displaying at least one rendered volume image from the fully acquired volumetric data sets on a display system connected to said platform.

14. The method of claim 13 further comprising:
modifying at least one display parameter of said displayed rendered volume image using at least one human interface device (HID) operationally connected to one or more of said two or more volumetric data sources via said platform, wherein modifying at least one parameter changes at least a portion of said plurality of fully acquired volumetric data sets being collected; and
updating said at least one rendered volume image within said platform in real time in response to said at least one modified display parameter.

15. The method of claim 13 further comprising at least one human interface device (HID), wherein said HID provides interactive quantitative analysis of said displayed rendered volume image from the plurality of fully acquired volumetric data sets.

16. The method of claim 15, wherein said quantitative analysis is accomplished when a further event command to the platform is made and said quantitative analysis is performed by said platform in response to said further event command to generate quantitative metrics.

17. The method of claim 16, wherein said platform sends said quantitative metrics to a viewer in real time using a remote framebuffer protocol, and said quantitative metrics is displayed by said viewer along with said rendered volume image from the fully acquired volumetric data in real time.

18. The method of claim 13 further comprising stereoscopic eyewear connected to and synchronized with a remote thin client viewer to provide stereoscopic viewing of at least one rendered volume image from the plurality of fully acquired volumetric data sets in real time to a user wearing a stereoscopic eyewear.

19. The method of claim 13 further comprising modifying at least one display parameter, including at least one of the following: an orientation change of said at least one rendered volume image; a color transfer function change of said at least one rendered volume image; an opacity transfer function change of said at least one rendered volume image; a segmentation parameter of said at least one rendered volume image; and an iso-surface generation parameter.

* * * * *